(12) United States Patent
Fang et al.

(10) Patent No.: US 11,650,576 B2
(45) Date of Patent: May 16, 2023

(54) KNOWLEDGE RECOMMENDATION FOR DEFECT REVIEW

(71) Applicant: ASML Netherlands B.V., AH Veldhoven (NL)

(72) Inventors: Wei Fang, Milpitas, CA (US); Cho Huak Teh, Hsinchu (TW); Robeter Jian, Hsinchu (TW); Yi-Ying Wang, Hsinchu (TW); Shih-Tsung Chen, Hsinchu (TW); Jian-Min Liao, Hsinchu (TW); Chuan Li, San Jose, CA (US); Zhaohui Guo, San Jose, CA (US); Pang-Hsuan Huang, Hsinchu (TW); Shao-Wei Lai, Hsinchu (TW); Shih-Tsung Hsu, Hsinchu (TW)

(73) Assignee: ASML Netherlands B.V., Veldhoven (NL)

( * ) Notice: Subject to any disclaimer, the term of this patent is extended or adjusted under 35 U.S.C. 154(b) by 0 days.

(21) Appl. No.: 16/479,199

(22) PCT Filed: Jan. 15, 2018

(86) PCT No.: PCT/EP2018/050903
§ 371 (c)(1),
(2) Date: Jul. 18, 2019

(87) PCT Pub. No.: WO2018/134158
PCT Pub. Date: Jul. 26, 2018

(65) Prior Publication Data
US 2019/0362488 A1 Nov. 28, 2019

Related U.S. Application Data

(60) Provisional application No. 62/612,593, filed on Dec. 31, 2017, provisional application No. 62/447,565, filed on Jan. 18, 2017.

(51) Int. Cl.
*G06T 7/00* (2017.01)
*G06K 9/62* (2022.01)
(Continued)

(52) U.S. Cl.
CPC ....... *G05B 19/41875* (2013.01); *G06F 18/24* (2023.01); *G06N 5/02* (2013.01); *G06T 7/0004* (2013.01); *G06T 2207/30148* (2013.01)

(58) Field of Classification Search
None
See application file for complete search history.

(56) References Cited

U.S. PATENT DOCUMENTS 6,701,259 B2    3/2004   Dor et al.
6,744,266 B2 *  6/2004   Dor .................. H01L 22/20
                                              257/E21.525

(Continued)

FOREIGN PATENT DOCUMENTS

CN    1392954 A    1/2003
CN    1650296 A    8/2005

(Continued)

OTHER PUBLICATIONS

Office Action issued in related International Application No. 107101853, from the Taiwan Intellectual Property Office, dated Nov. 26, 2018; Chinese-language and English-language translation included (10 pgs.).

(Continued)

*Primary Examiner* — Nancy Bitar
(74) *Attorney, Agent, or Firm* — Finnegan, Henderson, Farabow, Garrett & Dunner, LLP

(57) ABSTRACT

A server for knowledge recommendation for defect review. The server includes a processor electronically coupled to an electronic storage device storing a plurality of knowledge files related to wafer defects. The processor is configured to (Continued)

execute a set of instruction to cause the server to: receive a request for knowledge recommendation for inspecting an inspection image from a defect classification server; search for a knowledge file in the electronic storage device that matches the inspection image; and transmit the search result to the defect classification server.

12 Claims, 8 Drawing Sheets

(51) Int. Cl.
*G06N 5/02* (2023.01)
*G05B 19/418* (2006.01)
*G06F 18/24* (2023.01)

(56) References Cited

U.S. PATENT DOCUMENTS

| | | | |
|---|---|---|---|
| 6,763,130 | B1 | 7/2004 | Somekh et al. |
| 6,999,614 | B1* | 2/2006 | Bakker ................. G06T 7/0004 |
| | | | 382/145 |
| 7,283,659 | B1* | 10/2007 | Bakker ................. G06K 9/6272 |
| | | | 382/145 |
| 9,471,594 | B1 | 10/2016 | Schnegelberger et al. |
| 2002/0161532 | A1* | 10/2002 | Dor ......................... H01L 22/20 |
| | | | 702/35 |
| 2003/0164942 | A1* | 9/2003 | Take ................. G01N 21/95607 |
| | | | 356/394 |
| 2009/0040830 | A1* | 2/2009 | Baek ....................... G11C 11/12 |
| | | | 365/185.11 |
| 2010/0215247 | A1* | 8/2010 | Kitamura ................ G06T 7/001 |
| | | | 382/145 |
| 2010/0226562 | A1* | 9/2010 | Wu ....................... G03F 7/7065 |
| | | | 382/149 |
| 2011/0276935 | A1 | 11/2011 | Fouquet et al. |
| 2013/0222574 | A1 | 8/2013 | Nakagaki et al. |
| 2015/0113102 | A1* | 4/2015 | Pazos ............... H04N 21/64315 |
| | | | 709/219 |
| 2016/0284579 | A1* | 9/2016 | Kaizerman ........... H01J 37/222 |
| 2019/0347784 | A1* | 11/2019 | Chen ................... G01N 21/9501 |

FOREIGN PATENT DOCUMENTS

| | | |
|---|---|---|
| CN | 101120329 A | 2/2008 |
| CN | 101246834 A | 8/2008 |
| CN | 103344660 A | 10/2013 |
| CN | 104914111 A | 9/2015 |
| CN | 105334216 A | 2/2016 |
| CN | 106290378 A | 1/2017 |
| KR | 20150113102 A | 10/2015 |
| TW | I240322 | 9/2005 |
| TW | I256468 | 6/2006 |
| TW | 201511156 A | 3/2015 |
| WO | WO 2002/029391 A | 4/2002 |
| WO | WO 2002/029392 A2 | 4/2002 |

OTHER PUBLICATIONS

Notification of Reasons for Refusal issued by the Korean Patent Office in related Korean Application No. 10-2019-7024055, dated Jan. 25, 2021 (5 pgs.).

Notification of Reason(s) for Refusal issued in related Korean Patent Application No. 10-2022-7002808; dated Feb. 23, 2022 (12 pgs.).

First Office Action from the Patent Office of the People's Republic of China issued in related Chinese Patent Application No. 201880007391.6; dated Jul. 21, 2022 (15 pgs.).

* cited by examiner

410

420

430

440

450

KNOWLEDGE RECOMMENDATION FOR DEFECT REVIEW

CROSS-REFERENCE TO RELATED APPLICATIONS

This application is a national stage filing under 35 U.S.C. § 371 of International Application No. PCT/EP2018/050903, filed on Jan. 15, 2018, and published as WO 2018/134158 A1, which is based upon and claims priority to U.S. Provisional Application No. 62/447,565, filed Jan. 18, 2017, and entitled "Auto Loading Knowledge for Defect Review," and to U.S. Provisional Application No. 62/612,593, filed Dec. 31, 2017, and entitled "Knowledge Recommendation for Defect Review, and the disclosures of these applications are incorporated herein by reference in their entireties.

TECHNICAL FIELD

The present disclosure generally relates to systems and methods for recommending knowledge files for defect review.

BACKGROUND

As demands for low cost and high performance electronic devices continues to grow, it is critical to control the manufacturing process of integrated circuits included in the electronic device, in order to reduce the number of defects that affect yield. A defect review process has been integrated into the controlling of the manufacturing process. During the defect review process, defects on semiconductor wafers are automatically identified and classified into various defect types. While the defect classification can be performed automatically, user's intervention is always required to select a knowledge file based on which the automatic defect classification is performed. The user's intervention significantly reduces the throughput of the manufacturing process.

SUMMARY

According to some embodiments of the disclosure, a server for knowledge recommendation for defect review is provided. The server includes a processor electronically coupled to an electronic storage device storing a plurality of knowledge files related to wafer defects. The processor is configured to execute a set of instruction to cause the server to: receive a request for knowledge recommendation for inspecting an inspection image from a defect classification server; search for a knowledge file in the electronic storage device that matches the inspection image; and transmit the search result to the defect classification server.

According to some embodiments of the disclosure, a server for defect classification is provided. The server includes a processor configured to execute a set of instructions to cause the server to: receive an inspection image of a wafer from an inspection tool; send a request for knowledge recommendation a knowledge recommendation server; receive a knowledge recommendation result from the knowledge recommendation server; determine whether the knowledge recommendation result includes a knowledge file; and in response to a determination that knowledge recommendation result includes a knowledge file, perform automatic defect classification on the inspection image by using the knowledge file.

According to some embodiments of the disclosure, a defect review system is provided. The defect review system includes an inspection tool for inspecting a wafer, a defect classification server electronically coupled to the inspection tool, and a knowledge recommendation server electronically coupled to the defect classification server. The defect classification server includes a processor configured to execute a set of instruction to cause the defect classification server to: receive an inspection image of the wafer from the inspection tool; and send a request for knowledge recommendation for inspecting the inspection image. The knowledge recommendation server includes a processor configured to execute a set of instruction to cause the knowledge recommendation server to: in response to a receipt of the request for knowledge recommendation from the defect recommendation server, search for a knowledge file that matches inspection image; and transmit a knowledge recommendation result to the defect classification server.

According to some embodiments of the disclosure, a method for knowledge recommendation is provided. The method includes: receiving a request for knowledge recommendation for inspecting an inspection image from a defect classification server; searching for a knowledge file in an electronic storage device that matches the inspection image, the electronic storage device storing a plurality of knowledge files related to wafer defects; and transmitting the search result to the defect classification server.

According to some embodiments of the disclosure, a method for defect classification is provided. The method includes: receiving an inspection image of a wafer from an inspection tool; sending a request for knowledge recommendation to a knowledge recommendation server; receiving a knowledge recommendation result from the knowledge recommendation server; determining whether the knowledge recommendation result includes a knowledge file; and in response to a determination that knowledge recommendation result includes a knowledge file, performing automatic defect classification on the inspection image by using the knowledge file.

According to some embodiments of the disclosure, a method for defect review is provided. The method includes: receiving, by a defect classification server, an inspection image of the wafer from an inspection tool; sending, by the defect classification server, a request for knowledge recommendation for inspecting the inspection image, to a knowledge recommendation server; in response to a receipt of the request for knowledge recommendation from the defect recommendation server, searching, by the knowledge recommendation server, for a knowledge file that matches inspection image; transmitting, by the knowledge recommendation server, a knowledge recommendation result to the defect classification server; and determining, by the defect classification server, whether the knowledge recommendation result transmitted from the knowledge recommendation server includes a knowledge file; and in response to a determination that knowledge recommendation result includes a knowledge file, performing, by the defect classification server, automatic defect classification on the inspection image by using the knowledge file.

According to some embodiments of the disclosure, a non-transitory computer-readable medium is provided. The non-transitory computer-readable medium stores a set of instructions that is executable by at least one processor of a knowledge recommendation server to cause the knowledge recommendation server to perform a method. The method includes: receiving a request for knowledge recommendation for inspecting an inspection image from a defect classification server; searching for a knowledge file in an electronic storage device that matches the inspection image, the electronic storage device storing a plurality of knowledge files related to wafer defects; and transmitting the search result to the defect classification server.

According to some embodiments of the disclosure, a non-transitory computer-readable medium is provided. The non-transitory computer-readable medium stores a set of instructions that is executable by at least one processor of a defect classification server to cause the defect classification server to perform a method. The method includes: receiving an inspection image of a wafer from an inspection tool; sending a request for knowledge recommendation to a knowledge recommendation server; receiving a knowledge recommendation result from the knowledge recommendation server; determining whether the knowledge recommendation result includes a knowledge file; and in response to a determination that knowledge recommendation result includes a knowledge file, performing automatic defect classification on the inspection image by using the knowledge file.

BRIEF DESCRIPTION OF THE DRAWINGS

The accompanying drawings, which are incorporated in and constitute a part of this specification, illustrate several embodiments.

DETAILED DESCRIPTION

Reference will now be made in detail to the example embodiments, which are illustrated in the accompanying drawings. Although the following embodiments are described in the context of utilizing electron beams, the disclosure is not so limited. Other types of charged particle beams can be similarly applied.

The disclosed embodiments provide a knowledge recommendation server for use in a defect review system. The knowledge recommendation server includes an electronic storage device that stores a plurality of knowledge files related to wafer defects. When receiving a request for knowledge recommendation for inspecting an inspection image from a defect classification server, the knowledge recommendation server searches for a knowledge file in the electronic storage device that matches the inspection image, and provides the knowledge file to the defect classification server. Then, the defect classification server performs automatic defect classification on the inspection image by using the knowledge file provided by the knowledge recommendation server.

Figure 1:
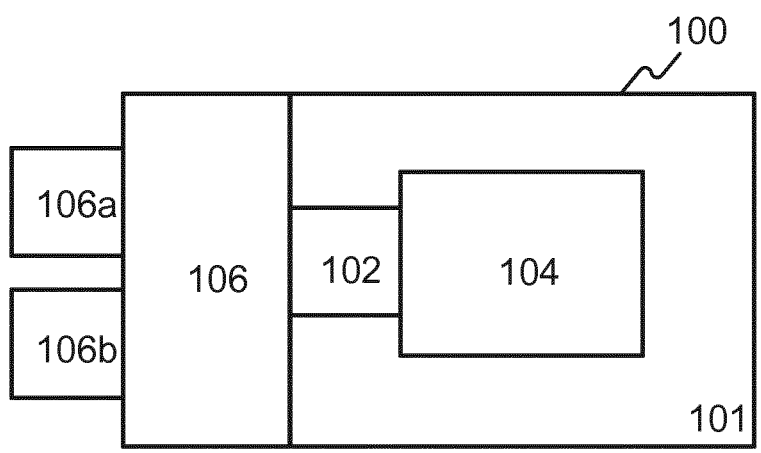
FIG. 1 is a schematic diagram illustrating an exemplary electron beam inspection (EBI) system, consistent with embodiments of the present disclosure.

FIG. 1 illustrates an exemplary electron beam inspection (EBI) system 100 consistent with embodiments of the present disclosure. As shown in FIG. 1, EBI system 100 includes a main chamber 101, a load/lock chamber 102, an electron beam tool 104, and an equipment front end module (EFEM) 106. Electron beam tool 104 is located within main chamber 101. EFEM 106 includes a first loading port 106a and a second loading port 106b. EFEM 106 may include additional loading port(s). First loading port 106a and second loading port 106b receive wafer cassettes that contain wafers (e.g., semiconductor wafers or wafers made of other material(s)) or samples to be inspected (wafers and samples are collectively referred to as "wafers" hereafter).

One or more robot arms (not shown) in EFEM 106 transport the wafers to load/lock chamber 102. Load/lock chamber 102 is connected to a load/lock vacuum pump system (not shown) which removes gas molecules in load/lock chamber 102 to reach a first pressure below the atmospheric pressure. After reaching the first pressure, one or more robot arms (not shown) transport the wafer from load/lock chamber 102 to main chamber 101. Main chamber 101 is connected to a main chamber vacuum pump system (not shown) which removes gas molecules in main chamber 101 to reach a second pressure below the first pressure. After reaching the second pressure, the wafer is subject to inspection by electron beam tool 104.

Figure 2:
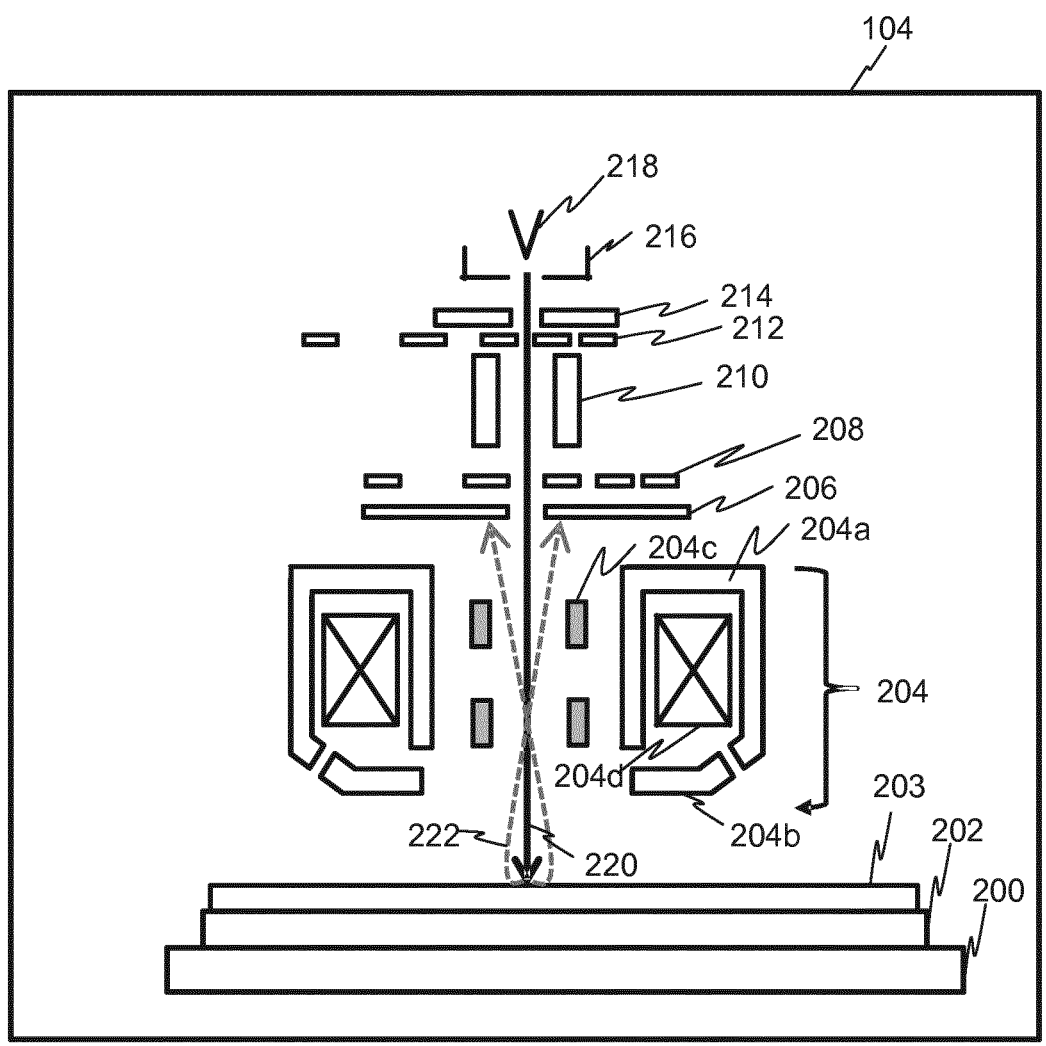
FIG. 2 is a schematic diagram illustrating an exemplary electron beam tool that can be a part of the exemplary electron beam inspection of FIG. 1, consistent with embodiments of the present disclosure.

FIG. 2 illustrates exemplary components of electron beam tool 104, consistent with embodiments of the present disclosure. As shown in FIG. 2, electron beam tool 104 includes a motorized stage 200, and a wafer holder 202 supported by motorized stage 200 to hold a wafer 203 to be inspected. Electron beam tool 104 further includes an objective lens assembly 204, electron detector 206 (which includes electron sensor surfaces 206a and 206b), an objective aperture 208, a condenser lens 210, a beam limit aperture 212, a gun aperture 214, an anode 216, and a cathode 218. Objective lens assembly 204, in one embodiment, can include a modified swing objective retarding immersion lens (SO-RIL), which includes a pole piece 204a, a control electrode 204b, a deflector 204c, and an exciting coil 204d. Electron beam tool 104 may additionally include an energy dispersive X-ray spectrometer (EDS) detector (not shown) to characterize the materials on the wafer.

A primary electron beam 220 is emitted from cathode 218 by applying a voltage between anode 216 and cathode 218. Primary electron beam 220 passes through gun aperture 214 and beam limit aperture 212, both of which can determine the size of electron beam entering condenser lens 210, which resides below beam limit aperture 212. Condenser lens 210 focuses primary electron beam 220 before the beam enters objective aperture 208 to set the size of the electron beam before entering objective lens assembly 204. Deflector 204c deflects primary electron beam 220 to facilitate beam scanning on the wafer. For example, in a scanning process, deflector 204c can be controlled to deflect primary electron beam 220 sequentially onto different locations of top surface of wafer 203 at different time points, to provide data for image reconstruction for different parts of wafer 203. Moreover, deflector 204c can also be controlled to deflect primary electron beam 220 onto different sides of wafer 203 at a particular location, at different time points, to provide data for stereo image reconstruction of the wafer structure at that location. Further, in some embodiments, anode 216 and cathode 218 can be configured to generate multiple primary electron beams 220, and electron beam tool 104 can include a plurality of deflectors 204c to project the multiple primary electron beams 220 to different parts/sides of the wafer at the same time, to provide data for image reconstruction for different parts of wafer 203.

Exciting coil 204d and pole piece 204a generate a magnetic field that begins at one end of pole piece 204a and terminates at the other end of pole piece 204a. A part of wafer 203 being scanned by primary electron beam 220 can be immersed in the magnetic field and can be electrically charged, which, in turn, creates an electric field. The electric field reduces the energy of impinging primary electron beam 220 near the surface of the wafer before it collides with the wafer. Control electrode 204b, being electrically isolated from pole piece 204a, controls an electric field on the wafer to prevent micro-arching of the wafer and to ensure proper beam focus.

A secondary electron beam 222 can be emitted from the part of wafer 203 upon receiving primary electron beam 220. Secondary electron beam 222 can form a beam spot (e.g., one of beam spots 240a and 240b) on sensor surfaces 206a and 206b of electron detector 206. Electron detector 206 can generate a signal (e.g., a voltage, a current, etc.) that represents an intensity of the beam spot, and provide the signal to a processing system (not shown in FIG. 2). The intensity of secondary electron beam 222, and the resultant beam spot, can vary according to the external and/or internal structure of wafer 203. Moreover, as discussed above, primary electron beam 220 can be projected onto different locations of the top surface of the wafer, and/or different sides of the wafer at a particular location, to generate secondary electron beams 222 (and the resultant beam spot) of different intensities. Therefore, by mapping the intensities of the beam spots with the locations of wafer 203, the processing system can reconstruct an image that reflects the internal and/or external structures of wafer 203.

Figure 3:
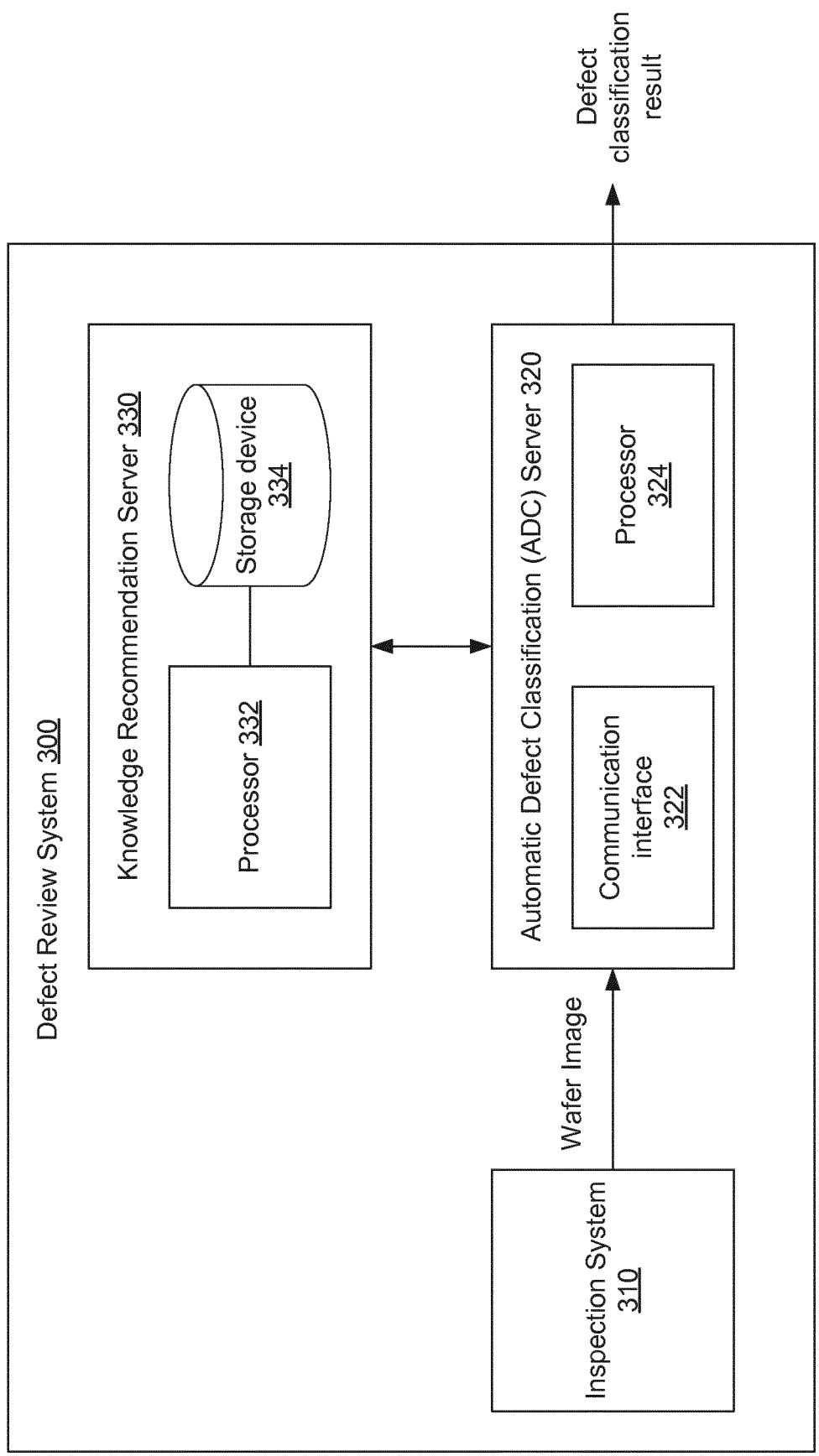
FIG. 3 is a block diagram of an exemplary defect review system, consistent with embodiments of the present disclosure.

Once a wafer image is acquired, the wafer image may be transmitted to a computer system where the system can identify defects on the wafer image, and classify the defects into categories according to the type of the defects. FIG. 3 is a schematic diagram of a defect review system 300, consistent with embodiments of the present disclosure.

Referring to FIG. 3, defect review system 300 includes a wafer inspection system 310, an Automatic Defect Classification (ADC) server 320, and a knowledge recommendation server 330 electrically coupled to the ADC server 320. Wafer inspection system 310 can be electron beam inspection (EBI) system 100 described with respect to FIG. 1. It is appreciated that ADC server 320 and knowledge recommendation server 330 can be part of and/or remote from EBI system 100.

Wafer inspection system 310 can be any inspection system that can generate an inspection image of a wafer. The wafer can be a semiconductor wafer substrate, or a semiconductor wafer substrate having one or more epi-layers and/or process films. Wafer inspection system 310 can be any currently available or developing wafer inspection system. The embodiments of the present disclosure does not limit the specific type for wafer inspection system 310 as long as it can generate a wafer image having a resolution high enough to observe key features on the wafer (e.g., less than 20 nm).

ADC server 320 has a communication interface 322 that is electrically coupled to the wafer inspection system 310 to receive the wafer image. ADC server 320 also includes a processor 324 that is configured to analyze the wafer image, and detect and classify wafer defects that appear on the wafer image by using a defect knowledge file. The defect knowledge file can be manually provided to ADC server 320 by an operator. Alternatively, according to the embodiments of the present disclosure, the defect knowledge file can be automatically provided to ADC server 320 by knowledge recommendation server 330, which will be described in detail below.

Knowledge recommendation server 330 is electrically coupled to the ADC server 320. Knowledge recommendation server 330 includes a processor 332 and a storage device 334. Processor 332 is configured to build a plurality of defect knowledge files, and store the plurality of defect knowledge files in the storage device 334.

The plurality of defect knowledge files contain information related to various types of defects generated during various stages of a wafer manufacturing process. The various stages of a wafer manufacturing process may include, but is not limited to, a lithography process, an etching process, a chemical mechanical polishing (CMP) process, and an interconnection forming process. Defects generated in the lithographic process may include, but are not limited to, photoresist (RP) residue defects due to PR deterioration or impurity, peeling defects, bridge defects, bubble defects, and dummy pattern missing defects due to pattern shift. Defects generated in an etching process may include, but are not limited to, etching residue defects, over-etching, defects and open circuit defect. Defects generated in a CMP process may include, but are not limited to, slurry residue defects, dishing defects, and erosion defects due to variance in polishing rates, and scratched due to polishing. Defects generated in an interconnection forming process may include, but are not limited to, broken line defects, void defects, extrusion defects, and bridge defects.

Processor 332 is configured to build the plurality of defect knowledge files based on a plurality of defect patch images. The plurality of defect patch images can be generated by a wafer inspection tool, such as electron beam tool 104 illustrated in FIG. 2. A defect patch image is a small image (e.g., 34×34 pixels) of a portion of the wafer that contains a defect. The defect patch image is usually centered on the defect, and includes neighboring pixels of the defect.

Figure 4:
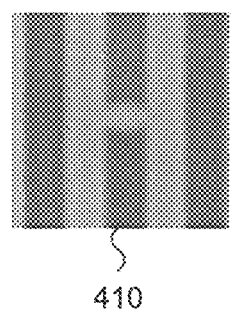
FIG. 4 shows examples of defect patch images.
Figure 4:
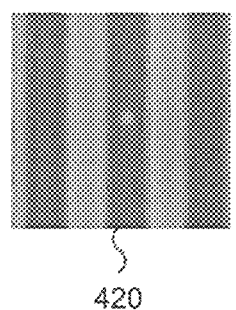
Figure 4:
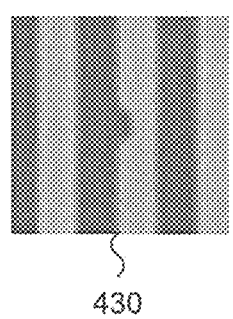
Figure 4:
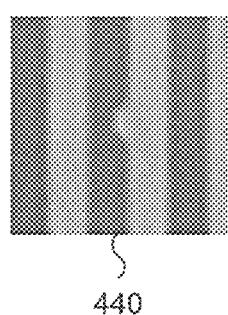
Figure 4:
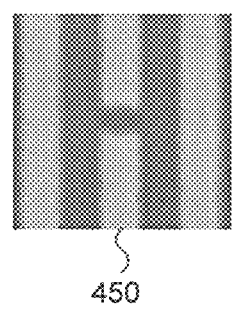

FIG. 4 shows exemplary defect patch images 410-450 of various defects in a metal interconnection layer. Image 410 is a patch image of a broken line defect. Image 420 is a patch image of a small void defect, in which the size of the void is smaller than a width of a metal line. Image 430 is a patch image of an extrusion defect. Image 440 is a patch image of a large void defect, in which the size of the void is larger than or comparable to a width of the metal line. Image 450 is a patch image of a bridge defect.

Referring back to FIG. 3, processor 332 can be trained, via a machine learning process, to build a knowledge file related to a specific type of defect based on a plurality of defect patch images of that type of defect. For example, processor 332 can be trained to build a knowledge file related to broken line defects generated in an interconnection forming process based on a plurality of defect patch images of broken line defects.

Processor 332 is also configured to, in response to a request for knowledge recommendation from ADC server 320, search for a knowledge file that matches a wafer image included in the received request, and provides the knowledge file to the ADC server 320.

Storage device 334 stores an ADC data center that contains a plurality of defect knowledge files related to various types of defects generated during various stages of a wafer manufacturing process. The plurality of defect knowledge files in the ADC data center may be built by processor 332 of knowledge recommendation server 330. Alternatively, a portion of the defect knowledge files in storage device 334 may be preset by a user or an external computer system, and may be preloaded into storage device 334.

A defect knowledge file can include general information about a single type of defect. The general information can include patch images and feature parameters to be used for later classification (e.g., size, edge roughness, depth, height, etc.) of the single type of defect. Alternatively, according to some embodiments of the present disclosure, a defect knowledge file can include general information about a plurality of types of defects that are present in the same process layer of a wafer. The single process layer can be, for example, a substrate layer, an epitaxial layer, a thin film layer, a photoresist layer, an oxide layer, a metal interconnection layer, etc.

Figure 5:
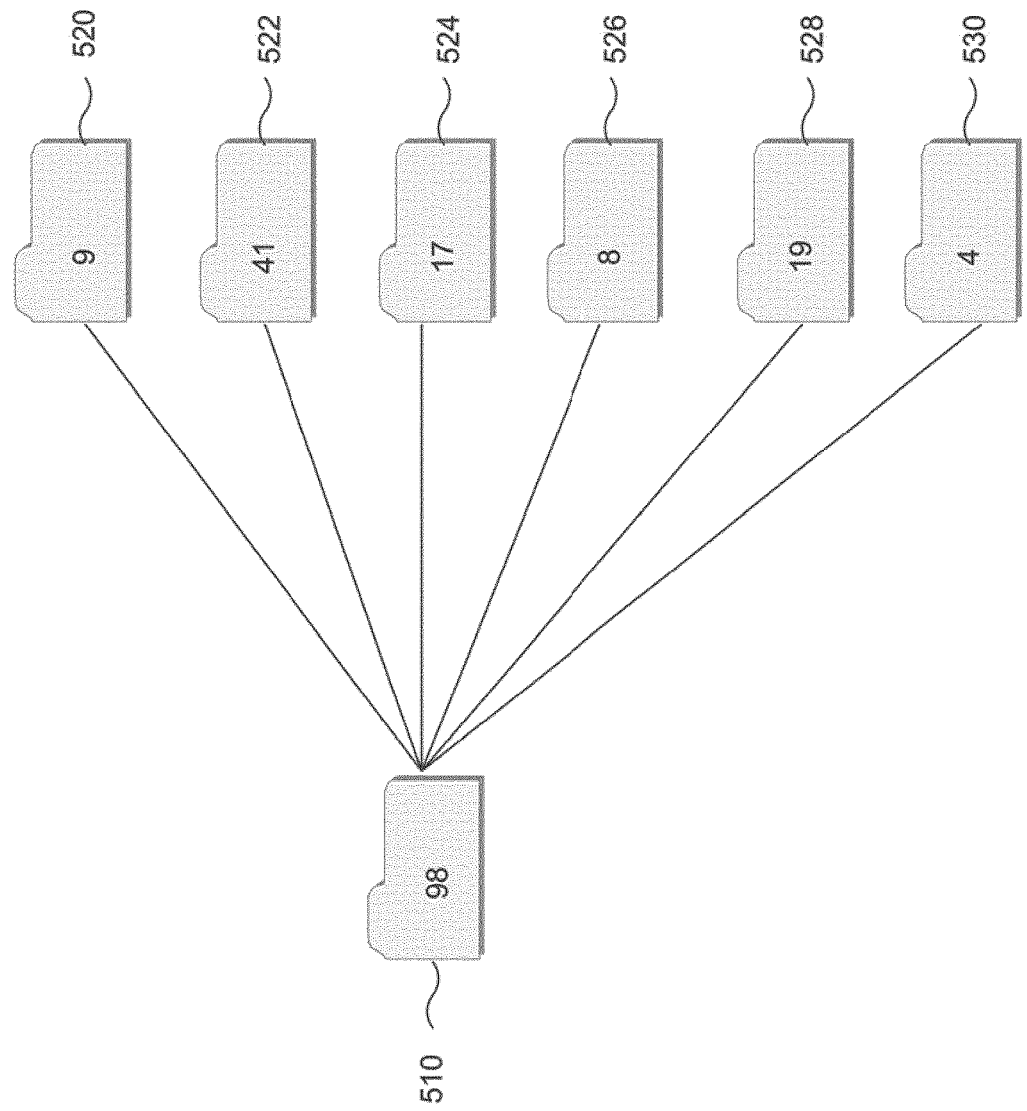
FIG. 5 schematically illustrates an exemplary defect knowledge file, consistent with some embodiments of the present disclosure.
Figure 6:
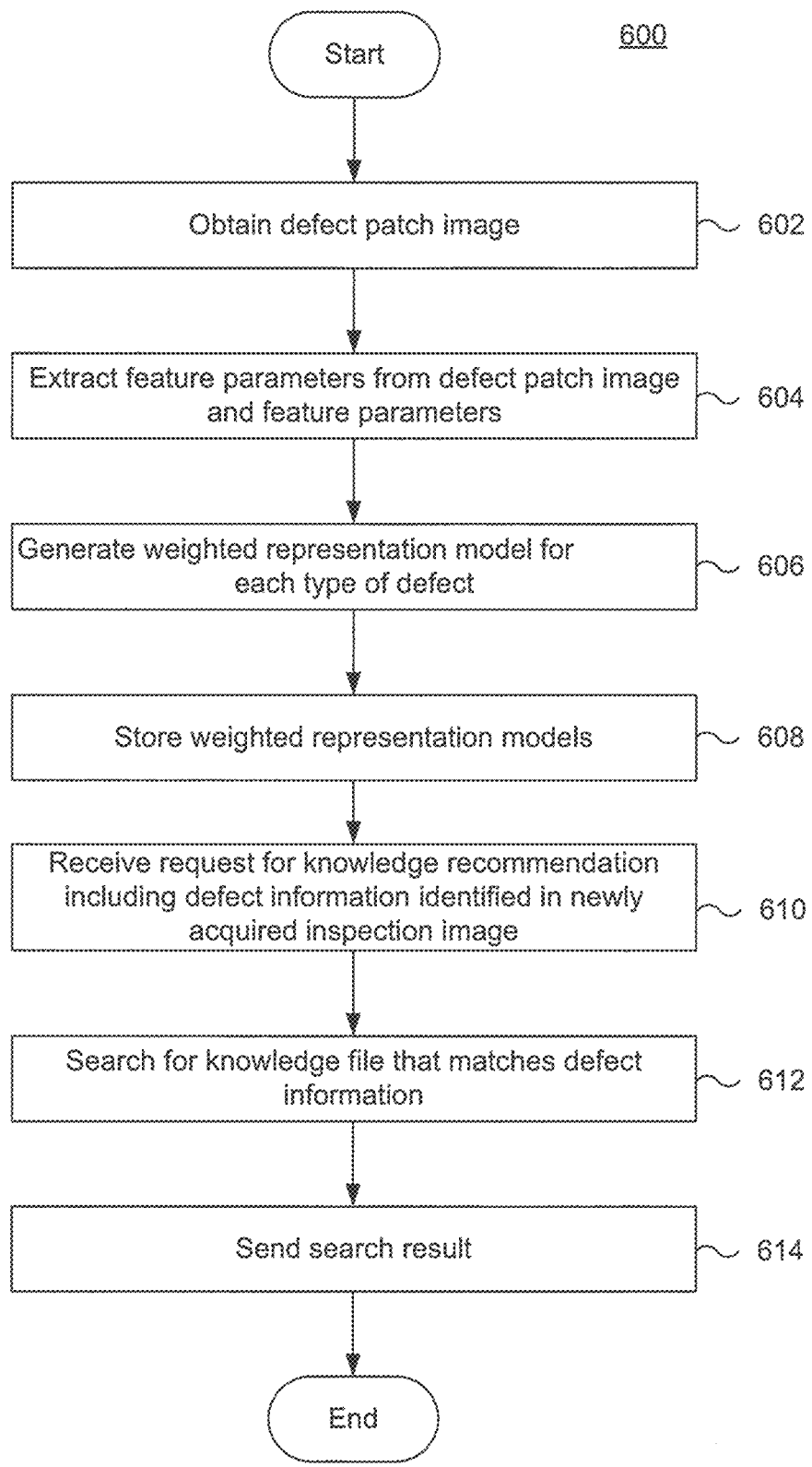
FIG. 6 is a flowchart of an exemplary process for knowledge recommendation, consistent with embodiments of the present disclosure.

FIG. 5 schematically illustrates an exemplary defect knowledge file according to some embodiments of the present disclosure. As shown in FIG. 5, a knowledge file 510 includes a plurality of sub-knowledge files 520-530 each related to a single type of defect in the wafer process layer. For example, the wafer process layer is a metal interconnection layer, and knowledge file 510 includes information related to various types of defects in the metal interconnection layer. Sub-knowledge file 520 includes information related to broken line defects, and includes 9 different patch images of the broken line defects and features extracted from the 9 patch images. Sub-knowledge file 522 includes information related to small void defects, and includes 41 different patch images of the small void defects and features extracted from the 9 patch images. Sub-knowledge file 524 includes information related to extrusion defects, and includes 17 different patch images of the extrusion defects and features extracted from the 17 patch images. Sub-knowledge file 526 includes information related to large void defects, and includes 8 different patch images of the large void defects and features extracted from the 8 patch images. Sub-knowledge file 528 includes information related to bridge defects, and includes 19 different patch images of the bridge defects and features extracted from the 19 patch images. Sub-knowledge file 530 includes information related to other types of defects, and includes 4 different patch images of the other types of defects and features extracted from the 4 patch images FIG. 6 is a flowchart of an exemplary process 600 for knowledge recommendation, consistent with embodiments of the present disclosure. Process 600 can be performed by a knowledge recommendation server (e.g., knowledge recommendation server 330 illustrated in FIG. 3). The knowledge recommendation server is coupled to, either by a communication cable or wirelessly over a network, a storage device (e.g., storage device illustrated in FIG. 3) which stores a plurality of knowledge files.

According to some embodiments of the present disclosure, the process 600 for knowledge recommendation is performed based on an assumption that defects in the same wafer process layer and inspected under similar inspection condition can share the same knowledge file. That is, a knowledge file includes information related to various defects in the same wafer process layer and inspected under similar inspection condition. The inspection condition refers to the settings of an inspection tool by which a plurality of defect patch images are generated. Taking electron beam tool 104 illustrated in FIG. 2 as an example, the inspection condition can include electron beam size, electron beam energy, scanning velocity, focusing condition, etc. Usually, different wafer process layers are inspected under different inspection conditions, while same wafer process layers are inspected under similar conditions and the resulting inspection images for a single type of defect would have similar features.

As illustrated in FIG. 6, first, at steps 602 through 608, the knowledge recommendation server pre-processes the knowledge files in the storage device by analyzing defect patch images and wafer inspection condition. Specifically, at step 602, the knowledge recommendation server obtains a plurality of defect patch images from the plurality of knowledge files stored in the storage device. As discussed above, the storage device includes a plurality of knowledge files, and each knowledge file includes information related to different types of defects in the same wafer process layer. The information related to each type of defect includes defect path images of that type of defect.

At step 604, the knowledge recommendation server analyzes the defect patch images, extracts feature parameters from the plurality of defect patch images, and normalizes the feature parameters. The feature parameters are parameters that describe various features of defects. For example, the feature parameters of a defect can include the size, depth, height, surface roughness, edge roughness, of the defect. The knowledge recommendation server can directly extract the feature parameters from the defect patch images. Or, for some specific types of features, the knowledge recommendation server can calculate the corresponding feature parameters based on other parameters extracted from the defect patch images.

At step 606, the knowledge recommendation server builds a plurality of weighted representation models based on the normalized patch image features. Each weighted representation model represents a type of defect, and includes a plurality of representative feature parameters that describe features of that type of defect. Taking voids in a metal interconnection layer as an example of a type of defect, the storage device then stores a plurality of patch images of voids in a metal interconnection layer. Each patch image contains a void. From each patch image, the knowledge recommendation server extracts a set of feature parameters. Each feature parameter describes one of a plurality of features (e.g., size, depth, edge roughness) of the void. After extracting feature parameters from all of the patch images of voids, the knowledge recommendation server calculates, for each feature, a weighted average of the feature parameters corresponding to that feature and extracted from all of the plurality of patch images of voids. When calculating the weighted average of the feature parameters, the weightings for each feature parameter can be preset by a use. The knowledge recommendation server treats the calculated weighted average of the feature parameters as a representative feature parameter of that feature. For example, the knowledge recommendation server calculates a weighted average of sizes of different voids in different patch images, and treats the calculated weighted average as the representative size of the voids in the metal interconnection layer. After calculating weighted averages for all of the features of voids, the knowledge recommendation server build a weighted representation model for the voids based on all of the weighted averages of the feature parameters of the voids.

The knowledge recommendation server then repeats the same process to build weighted representation models for other types of defects.

At step 608, the knowledge recommendation server stores the plurality of weighted representation models in the storage device. For example, the knowledge recommendation server can add the weighted representation models into the existing knowledge files in the storage device. Alternatively, the knowledge recommendation server can build a plurality of new knowledge files, each new knowledge files consisting of a plurality of weighted representation models of a plurality of types of defects in a corresponding wafer process layer. The knowledge recommendation server then saves the new knowledge files in the storage device.

After the pre-processing at steps 602 through 608, the knowledge recommendation server is available for providing knowledge recommendation. Specifically, at step 610, the knowledge recommendation server receives a request for knowledge recommendation from a defect classification server (e.g., ADC server 320 illustrated in FIG. 3). The defect classification server can be coupled to the knowledge recommendation server either by a communication cable or wirelessly over a network. The request for knowledge recommendation includes an inspection image of a wafer generated by an inspection tool, and information related to defects identified in the inspection image. The information related to the defects includes patch images and feature parameters of the defects.

At step 612, the knowledge recommendation server accesses the storage unit to search for a knowledge file that matches the defect information in the inspection image. For example, the knowledge recommendation server extracts feature parameters from the patch images of the defects in the inspection image. Then, the knowledge recommendation server compares the exacted feature parameters with the feature parameters in the knowledge files stored in the storage device. The knowledge recommendation server employs a features combination search strategy to select a knowledge file that contains defect feature parameters that best matches the feature parameters extracted from the inspection image. Alternatively, the knowledge recommendation server can employ a pattern search strategy to search for a knowledge file that contains defect patch images that match the defect patch images of the inspection image.

At step 614, the knowledge recommendation server sends the search result as a knowledge recommendation result to the defect classification server, and then process 600 is completed. If the knowledge recommendation server finds a knowledge file that matches the defect information identified in the inspection image, then the knowledge recommendation server provides the knowledge file to the defect classification server. On the hand, if the knowledge recommendation server cannot find a knowledge file that matches the defect information identified in the inspection image, the knowledge recommendation server can send a message to inform the defect classification server that no knowledge file can be found. Alternatively, the knowledge recommendation server can provide a default knowledge file to the defect classification server.

Still alternatively, according to some embodiments of the present disclosure, if the knowledge recommendation server cannot find a knowledge file that matches the defect information identified in the inspection image, the knowledge recommendation server generates new weighted representation models by varying the weightings for the feature parameters, builds a new knowledge file using the new weighted representation models, and determines whether the new knowledge file matches the defect information identified in the inspection image. The knowledge recommendation server can repeatedly build new knowledge files until a new knowledge file matches the defect information identified in the inspection image.

Figure 7:
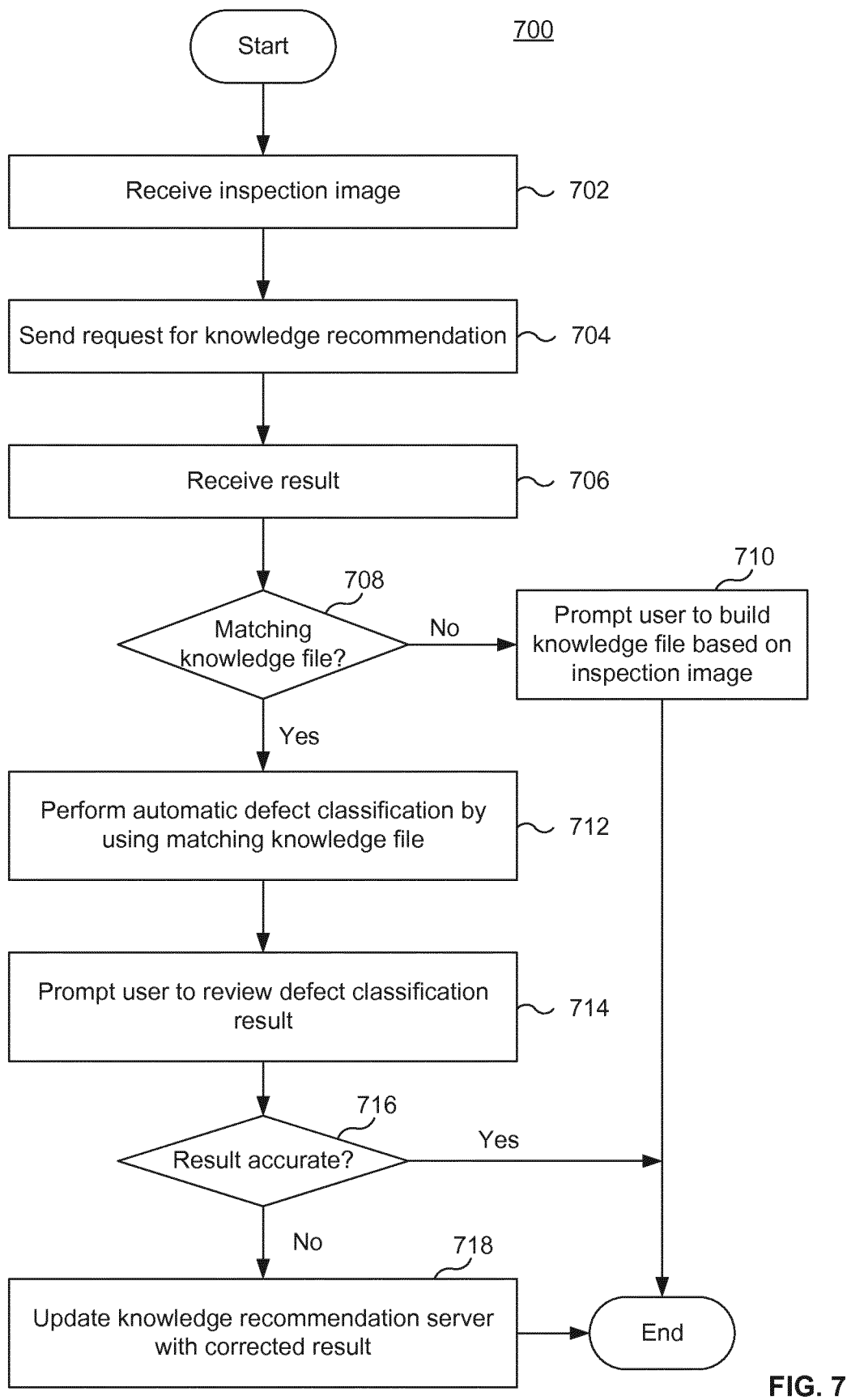
FIG. 7 is a flowchart of an exemplary process for automatic defect classification, consistent with embodiments of the present disclosure.

FIG. 7 is a flowchart of an exemplary process 700 for automatic defect classification, consistent with embodiments of the present disclosure. Process 700 can be performed by a defect classification server (e.g., ADC server 320 in FIG. 3). The defect classification server is coupled to, either by a communication cable or wirelessly over a network, an inspection tool (e.g., electron beam tool 104 in FIG. 2) and a knowledge recommendation server (e.g., knowledge recommendation server 330 in FIG. 3).

As illustrated in FIG. 7, first, at step 702, the defect classification server receives a wafer inspection image generated by the inspection system. At step 704, the defect classification server analyzes the inspection image to identify a plurality of defects, extracts information related to each defect, and then sends a request for knowledge recommendation to the knowledge recommendation server. The request for knowledge recommendation includes the extracted information related to the defects identified in the inspection image, which includes patch images and feature parameters of the defects.

When the knowledge recommendation server receives the request for knowledge recommendation, the knowledge recommendation server searches for a knowledge file that matches the defect information included in the request in process 600, and transmits the search result to the defect classification server. Thus, at step 706, the defect classification server receives the search result from the knowledge recommendation server.

At step 708, the defect classification server determines whether the search result includes a knowledge file that matches the defect information of the wafer inspection image. If the search result does not include such a knowledge file (step 708: No), then, at step 710, the defect classification server prompts a user to build a knowledge file based on the wafer inspection image. The defect classification server can prompt the user by displaying a prompting message on a display, or sending a signal to a user terminal. After step 710, process 710 is completed.

If the search result includes a knowledge file (step 708: Yes), then, at step 712, the defect classification server performs automatic defect classification by using the knowledge file provided by the knowledge recommendation server. In the automatic defect classification, the defect classification server compares the defect patch image and/or feature parameters of each defect in the wafer inspection image with the defect patch images and/or feature parameters in the knowledge file, and identifies the type of the defect.

After the automatic defect classification, at step 714, the defect classification server prompts a user to review the defect classification result. For example, the defect classification server can display the defect classification result on a display, which shows the patch images of the defects in the wafer inspection image with a label indicating the type of the defect. In response to the prompt, the user can visually inspect the defect classification result, determine whether the result is accurate, and provide feedback regarding the determination result to the defect classification server. Additionally, if the defect classification result is not accurate, the user can correct the defect classification result and provide feedback regarding the corrected result to the defect classification server. For example, if the defect classification result of one or more defects is not accurate, the user can input the name of the correct type of the one or more defect.

At step 716, the defect classification server determines whether the defect classification result is accurate. If the defect classification result is accurate (step 716: Yes), then process 700 is completed. If the defect classification result is not accurate (step 716: No), then, at step 718, the defect classification server passes the corrected result feedback by the user, to the knowledge recommendation server. Then, the knowledge recommendation server can update the knowledge files in the storage unit with the corrected result. After step 718, the process is completed.

Figure 8:
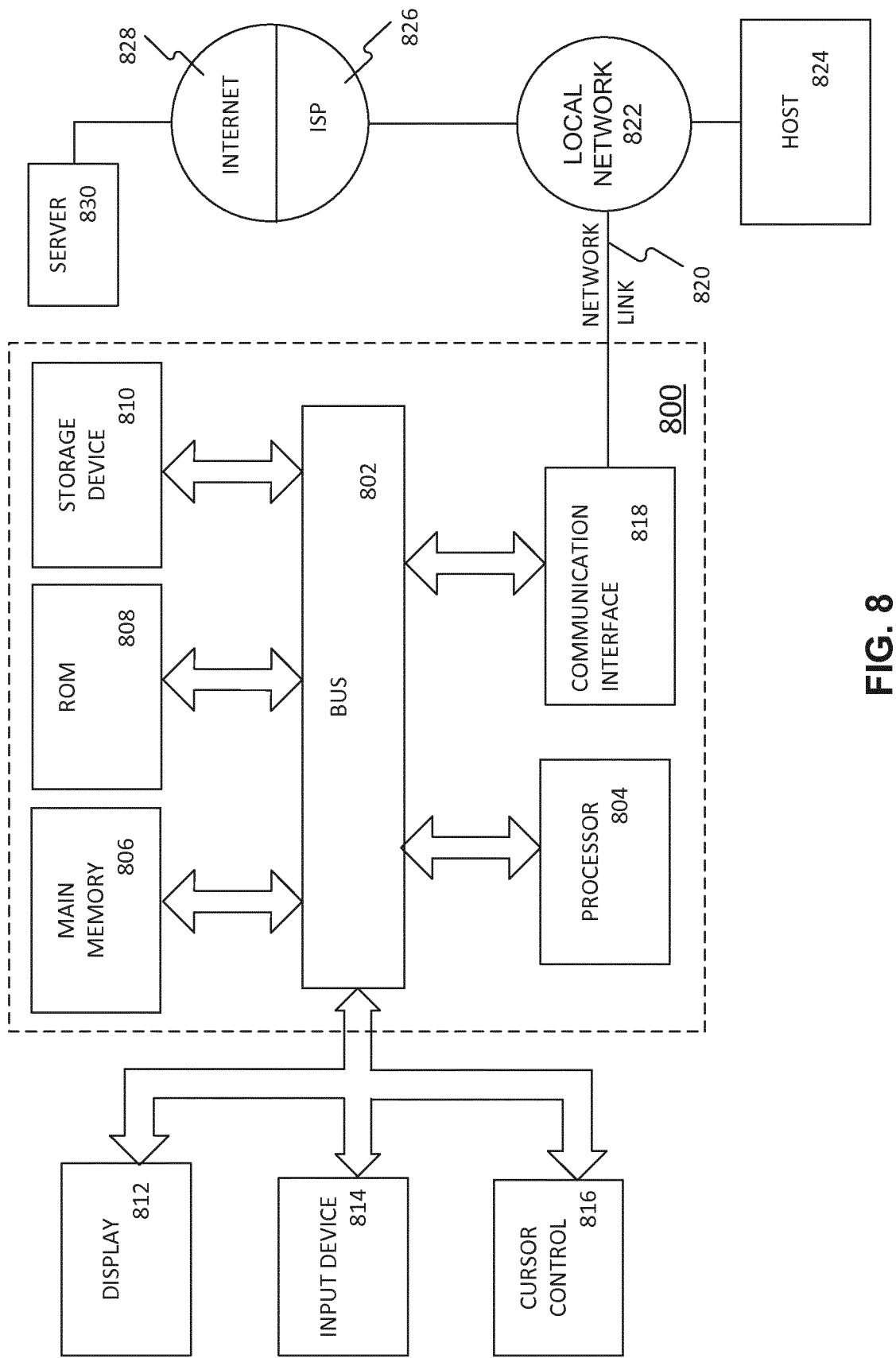
FIG. 8 is a block diagram of an exemplary computer system on which embodiments described herein can be implemented.

FIG. 8 is a block diagram of an exemplary computer system 800 with which embodiments described herein can be implemented. At least one of the knowledge recommendation server and the defect classification server described above can be implemented with computer system 800.

Computer system 800 includes a bus 802 or other communication mechanism for communicating information, and one or more hardware processors 804 (denoted as processor 804 for purposes of simplicity; e.g., processor 332 of knowledge recommendation server 330 or processor 324 of defect classification server 320 of FIG. 3) coupled with bus 802 for processing information. Hardware processor 804 can be, for example, one or more microprocessors.

Computer system 800 also includes a main memory 806, such as a random access memory (RAM) or other dynamic storage device, coupled to bus 802 for storing information and instructions to be executed by processor 804. Main memory 806 also can be used for storing temporary variables or other intermediate information during execution of instructions to be executed by processor 804. Such instructions, after being stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810 (e.g., storage device 334 of knowledge recommendation server 330 of FIG. 3), such as a magnetic disk, optical disk, or USB thumb drive (Flash drive), etc., is provided and coupled to bus 802 for storing information and instructions.

Computer system 800 can be coupled via bus 802 to a display 812, such as a cathode ray tube (CRT), an liquid crystal display (LCD), or a touch screen, for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. The input device typically has two degrees of freedom in two axes, a first axis (for example, x) and a second axis (for example, y), that allows the device to specify positions in a plane. In some embodiments, the same direction information and command selections as cursor control may be implemented via receiving touches on a touch screen without a cursor.

Computing system 800 can include a user interface module to implement a graphical user interface (GUI) that can be stored in a mass storage device as executable software codes that are executed by the one or more computing devices. This and other modules can include, by way of example, components, such as software components, object-oriented software components, class components and task components, processes, functions, fields, procedures, subroutines, segments of program code, drivers, firmware, microcode, circuitry, data, databases, data structures, tables, arrays, and variables. The modules may include, for example, one or more components of system 300 illustrated in FIG. 3.

Computer system 800 can implement the techniques described herein using customized hard-wired logic, one or more ASICs or FPGAs, firmware and/or program logic which in combination with the computer system causes or programs computer system 800 to be a special-purpose machine. According to some embodiments, the operations, functionalities, and techniques and other features described herein are performed by computer system 800 in response to processor 804 executing one or more sequences of one or more instructions contained in main memory 806. Such instructions can be read into main memory 806 from another storage medium, such as storage device 810. Execution of the sequences of instructions contained in main memory 806 causes processor 804 to perform the method steps (e.g., process 600 of FIG. 6, or process 700 of FIG. 7) described herein. In alternative embodiments, hard-wired circuitry can be used in place of or in combination with software instructions.

The embodiments may further be described using the following clauses:

1. A server for knowledge recommendation for defect review, comprising:
    a processor electronically coupled to an electronic storage device storing a plurality of knowledge files related to wafer defects, the processor configured to execute a set of instruction to cause the server to:
    receive a request for knowledge recommendation for inspecting an inspection image from a defect classification server;
    search for a knowledge file in the electronic storage device that matches the inspection image; and transmit the search result to the defect classification server.
2. The server of clause 1, wherein the processor is configured to execute the set of instructions to cause the server to:
    obtain a plurality of defect patch images from the knowledge files in the electronic storage device;
    extract feature parameters from the plurality of defect patch images and normalize the feature parameters;
    generate a plurality of weighted representation models based on the normalized feature parameters, each weighted representation model representing a defect type; and
    store the weighted representation models in the electronic storage device.
3. The server of clause 1, wherein the request for knowledge recommendation includes feature parameters of a plurality of defects identified in the inspection image, and
    in searching for a knowledge file that matches the inspection image, the processor is configured to execute the set of instructions to cause the server to:
    compare the feature parameters of the plurality of defects identified in the inspection image with the feature parameters in the knowledge files in the electronic storage device; and search for a knowledge file that has feature parameters that match the feature parameters of the plurality of defects identified in the newly acquired inspection image.

4. The server of any one of clauses 1 to 3, wherein each knowledge file includes a plurality of defect patch images and feature parameters of different types of defects in the same wafer process layer and generated by an inspection tool under the same inspection condition.

5. The server of any one of clauses 1 to 4, wherein the defect patch images are generated by an electron-beam inspection tool.

6. A server for defect classification, comprising:
    a processor configured to execute a set of instructions to cause the server to:
    receive an inspection image of a wafer from an inspection tool;
    send a request for knowledge recommendation a knowledge recommendation server;
    receive a knowledge recommendation result from the knowledge recommendation server;
    determine whether the knowledge recommendation result includes a knowledge file; and
    in response to a determination that knowledge recommendation result includes a knowledge file, perform automatic defect classification on the inspection image by using the knowledge file.

7. The server of clause 6, wherein the processer is configured to execute a set of instructions to cause the server to:
    in response to a determination that knowledge recommendation result does not include a knowledge file, prompt a user to build a knowledge file based on the inspection image.

8. The server of clause 6, wherein the processor is configured to execute a set of instructions to cause the server to:
    after the performance of the automatic defect classification on the inspection image, prompt a user to review of a result of the automatic defect classification.

9. The server of clause 8, wherein the processor is configured to execute a set of instructions to cause the server to:
    in response to a receipt of an input from the user indicating that the result of the automatic defect classification is not accurate and including a corrected defect classification result, transmit the corrected defect classification result to the knowledge recommendation server,
    wherein the knowledge recommendation server updates the knowledge files based on the corrected defect classification result.

10. The server of any one of clauses 6 to 9, wherein the inspection tool is an electron-beam inspection tool.

11. A defect review system, comprising:
    an inspection tool for inspecting a wafer;
    a defect classification server electronically coupled to the inspection tool, and includes a processor configured to execute a set of instruction to cause the defect classification server to:
    receive an inspection image of the wafer from the inspection tool; and
    send a request for knowledge recommendation for inspecting the inspection image;
    a knowledge recommendation server electronically coupled to the defect classification server, and includes a processor configured to execute a set of instruction to cause the knowledge recommendation server to:
    in response to a receipt of the request for knowledge recommendation from the defect recommendation server, search for a knowledge file that matches inspection image; and
    transmit a knowledge recommendation result to the defect classification server.

12. The defect review system of clause 11, wherein the knowledge recommendation server comprises an electronic storage device storing a plurality of knowledge files related to wafer defects.

13. The defect review system of clause 12, wherein the processor of the knowledge recommendation server is configured to execute a set of instruction to cause the knowledge recommendation server to:
    obtain a plurality of defect patch images from the knowledge files in the electronic storage device;
    extract feature parameters from the plurality of defect patch images and normalize the feature parameters;
    generate a plurality of weighted representation models based on the normalized feature parameters, each weighted representation model representing a defect type; and
    store the weighted representation models in electronic storage device.

14. The defect review system of clause 13, wherein the request for knowledge recommendation includes feature parameters of a plurality of defects identified in the newly acquired inspection image, and
    compare the feature parameters of the plurality of defects identified in the inspection image with the feature parameters in the knowledge files in the electronic storage device; and
    search for a knowledge file that has feature parameters that match feature parameters of the plurality of defects identified in the newly acquired inspection image.

15. The defect review system of any one of clauses 12 to 14, wherein each knowledge file includes a plurality of defect patch images and feature parameters of different types of defects in the same wafer process layer and generated by an inspection tool under the same inspection condition.

16. The defect review system of any one of clauses 11 to 15, wherein the inspection tool is an electron-beam inspection tool.

17. The defect review system of any one of clauses 11 to 16, wherein the processor of the defect classification server is configured to execute a set of instructions to cause the defect classification server to:
    determine whether the knowledge recommendation result transmitted from the knowledge recommendation server includes a knowledge file; and
    in response to a determination that knowledge recommendation result includes a knowledge file, perform automatic defect classification on the inspection image by using the knowledge file.

18. The defect review system of any one of clauses 11 to 17, wherein the processor of the defect classification server is configured to execute a set of instructions to cause the defect classification server to:
in response to a determination that knowledge recommendation result does not include a knowledge file, prompt a user to build a knowledge file based on the inspection image.

19. The defect review system of any one of clauses 11 to 17, wherein the processor of the defect classification server is configured to execute a set of instructions to cause the defect classification server to:
after the performance of automatic defect classification on the inspection image, prompt a user to review of a result of the automatic defect classification.

20. The defect review system of clause 19, wherein the processor of the defect classification server is configured to execute a set of instructions to cause the defect classification server to:
in response to a receipt of an input from the user indicating that the result of the automatic defect classification is not accurate and including a corrected defect classification result, transmit the corrected defect classification result to the knowledge recommendation server,
wherein the processor of the knowledge recommendation server is configured to execute a set of instructions to cause the knowledge recommendation server to update the knowledge files in the electronic storage device according to the corrected defect classification result.

21. A method for knowledge recommendation, comprising:
receiving a request for knowledge recommendation for inspecting an inspection image from a defect classification server;
searching for a knowledge file in an electronic storage device that matches the inspection image, the electronic storage device storing a plurality of knowledge files related to wafer defects; and transmitting the search result to the defect classification server.

22. The method of clause 21, further comprising:
obtaining a plurality of defect patch images from the plurality of knowledge files;
extracting feature parameters from the plurality of defect patch images and normalizing the feature parameters;
generating a plurality of weighted representation models based on the normalized feature parameters, each weighted representation model representing a defect type; and
storing the weighted representation models in the electronic storage device.

23. The method of clause 21, where the request for knowledge recommendation includes feature parameters of a plurality of defects identified in the inspection image, and
the searching for a knowledge file further comprises:
comparing the feature parameters of the plurality of defects identified in the inspection image with the feature parameters in the knowledge files in the electronic storage device; and
searching for a knowledge file that has feature parameters that match the feature parameters of the plurality of defects identified in the newly acquired inspection image.

24. The method of any one of clauses 21 to 23, wherein each knowledge file includes a plurality of defect patch images and feature parameters of different types of defects in the same wafer process layer and generated by an inspection tool under the same inspection condition.

25. The method of any one of clauses 21 to 24, wherein the defect patch images are generated by an electron-beam inspection tool.

26. A method for defect classification, comprising:
receiving an inspection image of a wafer from an inspection tool;
sending a request for knowledge recommendation to a knowledge recommendation server;
receiving a knowledge recommendation result from the knowledge recommendation server;
determining whether the knowledge recommendation result includes a knowledge file; and
in response to a determination that knowledge recommendation result includes a knowledge file, performing automatic defect classification on the inspection image by using the knowledge file.

27. The method of clause 26, further comprising:
in response to a determination that knowledge recommendation result does not include a knowledge file, prompting a user to build a knowledge file based on the inspection image.

28. The method of clause 26, further comprising:
after the performance of the automatic defect classification on the inspection image, prompting a user to review of a result of the automatic defect classification.

29. The method of clause 28, further comprising:
in response to a receipt of an input from the user indicating that the result of the automatic defect classification is not accurate and including a corrected defect classification result, transmitting the corrected defect classification result to the knowledge recommendation server,
wherein the knowledge recommendation server updates the knowledge files based on the corrected defect classification result.

30. The method of any one of clauses 26 to 29, wherein the inspection tool is an electron-beam inspection tool.

31. A method for defect review, comprising:
receiving, by a defect classification server, an inspection image of the wafer from an inspection tool;
sending, by the defect classification server, a request for knowledge recommendation for inspecting the inspection image, to a knowledge recommendation server;
in response to a receipt of the request for knowledge recommendation from the defect recommendation server, searching, by the knowledge recommendation server, for a knowledge file that matches inspection image;
transmitting, by the knowledge recommendation server, a knowledge recommendation result to the defect classification server;
determining, by the defect classification server, whether the knowledge recommendation result transmitted from the knowledge recommendation server includes a knowledge file; and
in response to a determination that knowledge recommendation result includes a knowledge file, performing, by the defect classification server, automatic defect classification on the inspection image by using the knowledge file.

32. A non-transitory computer-readable medium that stores a set of instructions that is executable by at least one processor of a knowledge recommendation server to cause the knowledge recommendation server to perform a method, the method comprising:
receiving a request for knowledge recommendation for inspecting an inspection image from a defect classification server;
searching for a knowledge file in an electronic storage device that matches the inspection image, the electronic storage device storing a plurality of knowledge files related to wafer defects; and
transmitting the search result to the defect classification server.

33. The non-transitory computer-readable medium of clause 32, wherein the method further comprises:
obtaining a plurality of defect patch images from the plurality of knowledge files;
extracting feature parameters from the plurality of defect patch images and normalizing the feature parameters;
generating a plurality of weighted representation models based on the normalized feature parameters, each weighted representation model representing a defect type; and
storing the weighted representation models in the electronic storage device.

34. The non-transitory computer-readable medium of clause 32, wherein the request for knowledge recommendation includes feature parameters of a plurality of defects identified in the inspection image, and
the method further comprises:
comparing the feature parameters of the plurality of defects identified in the inspection image with the feature parameters in the knowledge files in the electronic storage device; and
searching for a knowledge file that has feature parameters that match the feature parameters of the plurality of defects identified in the newly acquired inspection image.

35. The non-transitory computer-readable medium of clause 32 to 34, wherein each knowledge file includes a plurality of defect patch images and feature parameters of different types of defects in the same wafer process layer and generated by an inspection tool under the same inspection condition.

36. The non-transitory computer-readable medium of clause 32 to 35, wherein the defect patch images are generated by an electron-beam inspection tool.

37. A non-transitory computer-readable medium that stores a set of instructions that is executable by at least one processor of a defect classification server to cause the defect classification server to perform a method, the method comprising:
receiving an inspection image of a wafer from an inspection tool;
sending a request for knowledge recommendation to a knowledge recommendation server;
receiving a knowledge recommendation result from the knowledge recommendation server;
determining whether the knowledge recommendation result includes a knowledge file; and
in response to a determination that knowledge recommendation result includes a knowledge file, performing automatic defect classification on the inspection image by using the knowledge file.

38. The non-transitory computer-readable medium of clause 37, wherein the method further comprises:
in response to a determination that knowledge recommendation result does not include a knowledge file, prompting a user to build a knowledge file based on the inspection image.

39. The non-transitory computer-readable medium of clause 37, wherein the method further comprises:
after the performance of the automatic defect classification on the inspection image, prompting a user to review of a result of the automatic defect classification.

40. The non-transitory computer-readable medium of clause 39, wherein the method further comprises:
in response to a receipt of an input from the user indicating that the result of the automatic defect classification is not accurate and including a corrected defect classification result, transmitting the corrected defect classification result to the knowledge recommendation server,
wherein the knowledge recommendation server updates the knowledge files based on the corrected defect classification result.

41. The non-transitory computer-readable medium of any one of clauses 37 to 40, wherein the inspection tool is an electron-beam inspection tool.

The term "non-transitory media" as used herein refers to any non-transitory media storing data and/or instructions that cause a machine to operate in a specific fashion. Such non-transitory media can comprise non-volatile media and/or volatile media. Non-volatile media can include, for example, optical or magnetic disks, such as storage device 810. Volatile media can include dynamic memory, such as main memory 806. Non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, register, cache, any other memory chip or cartridge, and networked versions of the same.

Non-transitory media is distinct from, but can be used in conjunction with, transmission media. Transmission media can participate in transferring information between storage media. For example, transmission media can include coaxial cables, copper wire and fiber optics, including the wires that comprise bus 802. Transmission media can also take the form of acoustic or light waves, such as those generated during radio-wave and infra-red data communications.

Various forms of media can be involved in carrying one or more sequences of one or more instructions to processor 804 for execution. For example, the instructions can initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 can optionally be stored on storage device 810 either before or after execution by processor 804.

Computer system 800 can also include a communication interface 818 coupled to bus 802. Communication interface 818 (e.g., communication interface 322 of defect classification server 320 of FIG. 3 or any communication interface (not shown) of knowledge recommendation server 330) can provide a two-way data communication coupling to a network link 820 that can be connected to a local network 822. For example, communication interface 818 can be an integrated services digital network (ISDN) card, cable modem, satellite modem, or a modem to provide a data communication connection to a corresponding type of telephone line. As another example, communication interface 818 can be a local area network (LAN) card to provide a data communication connection to a compatible LAN. Wireless links can also be implemented. In any such implementation, communication interface 818 can send and receive electrical, electromagnetic or optical signals that carry digital data streams representing various types of information.

Network link 820 can typically provide data communication through one or more networks to other data devices. For example, network link 820 can provide a connection through local network 822 to a host computer 824 or to data equipment operated by an Internet Service Provider (ISP) 826. ISP 826 in turn can provide data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, can be example forms of transmission media.

Computer system 800 can send messages and receive data, including program code, through the network(s), network link 820 and communication interface 818. In the Internet example, a server 830 can transmit a requested code for an application program through Internet 828, ISP 826, local network 822 and communication interface 818.

The received code can be executed by processor 804 as it is received, and/or stored in storage device 810, or other non-volatile storage for later execution. In some embodiments, server 830 can provide information for being displayed on a display.

According to the above disclosed embodiments, a defect review system includes a knowledge recommendation server that can provide recommended knowledge files to a defect classification server which can classify defects by using the knowledge files. Compared to a typical defect review system in which a user needs to visually analyze a newly acquired wafer inspection image, and spent significant time searching for a knowledge file for use in defect classification, the defect review system of the disclosed embodiments can perform the entire defect review process in a real-time scenario, i.e., as soon as wafer inspection images are generated without user intervention. As a result, the throughput of the defect review process is increased.

In addition, the typical defect review system relies on users' experience to select knowledge files for use in defect classification, which may cause inaccurate defect classification results. In contrasts, the knowledge recommendation system of the disclosed embodiments searches for knowledge files based on defect feature parameters exacted from defect patch image, which can generate more accurate results.

While the present invention has been described in connection with various embodiments, other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A server for knowledge recommendation for defect review, comprising:
 one or more processors electronically coupled to an electronic storage device storing a plurality of knowledge files related to wafer defects, each knowledge file comprising:
  a plurality of defect patch images and feature parameters of different types of defects, the plurality of defect patch images and feature parameters being generated from a same wafer process layer under a same inspection condition, and
  a plurality of weighted representation models representing the different types of defects, respectively, each weighted representation model being a weighted average of a plurality of feature parameters associated with a respective type of defect,
 wherein the one or more processors are configured to execute a set of instruction to cause the server to:
  receive a request for knowledge recommendation for inspecting an inspection image from a defect classification server;
  search for a knowledge file in the electronic storage device that matches the inspection image; and
  transmit the search result to the defect classification server.

2. The server of claim 1, wherein in generating the plurality of weighted representation models, the one or more processors are configured to execute the set of instructions to cause the server to:
 obtain, from the knowledge files in the electronic storage device, a plurality of defect patch images corresponding to a first defect type;
 extract feature parameters from the plurality of defect patch images corresponding to the first defect type, and normalize the feature parameters;
 generate a weighted representation model of the first defect type, by determining a weighted average of the normalized feature parameters; and
 store the weighted representation model of the first defect type in the electronic storage device.

3. The server of claim 1, wherein the request for knowledge recommendation includes feature parameters of a plurality of defects identified in the inspection image, and
 in searching for a knowledge file that matches the inspection image, the one or more processors are configured to execute the set of instructions to cause the server to:
  compare the feature parameters of the plurality of defects identified in the inspection image with the feature parameters in the knowledge files in the electronic storage device; and
  search for a knowledge file that has feature parameters that match the feature parameters of the plurality of defects identified in the newly acquired inspection image.

4. The server of claim 1, wherein the defect patch images are generated by an electron-beam inspection tool.

5. A server for defect classification, comprising:
one or more processors configured to execute a set of instructions to cause the server to:
receive an inspection image of a wafer from an inspection tool;
send a request for knowledge recommendation to a knowledge recommendation server;
receive a knowledge recommendation result from the knowledge recommendation server;
determine whether the knowledge recommendation result includes a knowledge file; and
in response to a determination that knowledge recommendation result includes a knowledge file, perform automatic defect classification on the inspection image by using the knowledge file,
wherein the knowledge file comprises:
a plurality of defect patch images and feature parameters of different types of defects, the plurality of defect patch images and feature parameters being generated from a same wafer process layer under a same inspection condition, and
a plurality of weighted representation models representing the different types of defects, respectively, each weighted representation model being a weighted average of a plurality of feature parameters associated with a respective type of defect.

6. The server of claim 5, wherein the one or more processors are configured to execute a set of instructions to cause the server to:
in response to a determination that knowledge recommendation result does not include a knowledge file, prompt a user to build a knowledge file based on the inspection image.

7. The server of claim 5, wherein the one or more processors are configured to execute a set of instructions to cause the server to:
after the performance of the automatic defect classification on the inspection image, prompt a user to review of a result of the automatic defect classification, and/or
wherein the one or more processors are configured to execute a set of instructions to cause the server to:
in response to a receipt of an input from the user indicating that the result of the automatic defect classification is not accurate and including a corrected defect classification result, transmit the corrected defect classification result to the knowledge recommendation server,
wherein the knowledge recommendation server updates the knowledge files based on the corrected defect classification result.

8. The server of claim 5, wherein the inspection tool is an electron-beam inspection tool.

9. A method for knowledge recommendation, comprising:
receiving a request for knowledge recommendation for inspecting an inspection image from a defect classification server;
searching for a knowledge file in an electronic storage device that matches the inspection image, the electronic storage device storing a plurality of knowledge files related to wafer defects, each of the plurality of knowledge files comprising:
a plurality of defect patch images and feature parameters of different types of defects, the plurality of defect patch images and feature parameters being generated from a same wafer process layer under a same inspection condition, and
a plurality of weighted representation models representing the different types of defects, respectively, each weighted representation model being a weighted average of a plurality of feature parameters associated with a respective type of defect; and
transmitting the search result to the defect classification server.

10. The method of claim 9, further comprising:
obtaining, from the plurality of knowledge files, a plurality of defect patch images corresponding to a first defect type;
extracting feature parameters from the plurality of defect patch images corresponding to the first defect type, and normalizing the feature parameters;
generating a plurality of weighted representation model of the first defect type, by determining a weighted average of the normalized feature parameters; and
storing the weighted representation model of the first defect type in the electronic storage device.

11. The method of claim 9, where the request for knowledge recommendation includes feature parameters of a plurality of defects identified in the inspection image, and
the searching for a knowledge file further comprises:
comparing the feature parameters of the plurality of defects identified in the inspection image with the feature parameters in the knowledge files in the electronic storage device; and
searching for a knowledge file that has feature parameters that match the feature parameters of the plurality of defects identified in the newly acquired inspection image.

12. The method of claim 9, wherein the defect patch images are generated by an electron-beam inspection tool.

* * * * *